United States Statutory Invention Registration [19]

[11] Reg. Number: H58

Smith et al. [45] Published: May 6, 1986

[54] ARMOR PENETRATION PROJECTILE

[75] Inventors: Wayne W. Smith, Rockaway; John F. Hedderich, III, Lake Hopatcong, both of N.J.

[73] Assignee: The United States of America as represented by the Secretary of the Army, Washington, D.C.

[21] Appl. No.: 737,375

[22] Filed: May 23, 1985

[51] Int. Cl.[4] ..... F42B 11/22

[52] U.S. Cl. ..... 102/476; 102/501

*Primary Examiner*—Harold J. Tudor

*Attorney, Agent, or Firm*—Anthony T. Lane; Harold H. Card, Jr.; Michael C. Sachs

[57] ABSTRACT

A projectile having an extendible nose portion which will extend the distance between the shaped charge of a projectile and the surface of the target at the time of detonation.

9 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ARMOR PENETRATION PROJECTILE

Field of the Invention

This invention relates to apparatus for controlling the detonation of an explosive projectile at a desired distance from the point of impact.

BACKGROUND OF THE INVENTION

Armor penetrating, high-explosive projectiles, have been modified in recent years with respect to the location of the detonator within the shell casing with respect to the explosive charge, the shape of the charge itself and the shape of the ogive.

In particular, it has been discovered that by the shaping of the front portion of the explosive charge and causing its detonation at a point remote from the target surface, one can increase the penetration of the charge through armor plate to a greater extent than if the charge detonated at the surface of the target. However, certain physical parameters limit the distance of the charge from the forward end of the nose cone of the projectile.

Conventional artillery is limited by its design to specific lengths of shell and caliber of projectile. Therefore, to have a projectile of conventional, standard length is a necessity.

In the course of research it has been discovered that the optimum distance between the target surface and the front of the shaped charge in a projectile is about six to seven times the diameter of the forward face of the shaped charge. Having the charge further from the forward tip of the nose cone is certainly achievable with conventional designs by having the shaped charge located further and further from the tip of the nose cone but it quickly reaches the point of diminishing returns as far as efficiency is concerned because moving the forward face of the shaped charge further from the forward tip of the nose cone cuts down on the amount of charge which may be housed in the casing.

The problem being attacked is to find a simple mechanical device for causing detonation at the optimum distance from the target surface.

SUMMARY OF THE INVENTION

This has been accomplished by the simple provision of an extendable forward end on the nose cone.

A bore was made in the forward end of the nose cone and coaxially therewith, ball races were mounted in the internal surface of the bore for purposes of guiding a reciprocal hollow tube. The tube is designed to project forwardly in flight, due to the flight itself, and extend ahead of the nose cone. Thereby, the tube engages the target surface prior to the time the nose cone proper reaches the target. The tube includes apparatus to cause detonation of the explosive charge upon the extended tube encountering the surface of the target.

The objects of the invention are set out briefly above and will be understood more fully by a review of the drawings and the description of the preferred embodiment which follows.

DESCRIPTION OF THE PREFERRED EMBODIMENT

Figure 2:
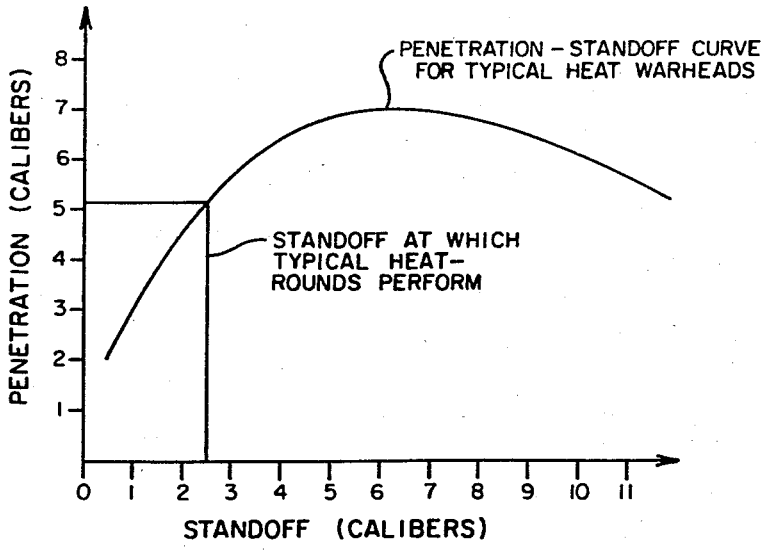
FIG. 2 is a graph showing the correlation between penetration of shaped charge heat rounds versus the detonation distance from the target surface based on the diameter of the forward end of the shaped charge.

An observation of FIG. 2 will show why the invention to be described is of importance. It is a graph showing the relationships between the penetration of a high explosive head round based on the stand-off distance from the target surface. Both the vertical and horizontal coordinates are based on the diameter of the forward face of the shaped explosive charge, called "calibers".

The lines converging on the graph at about 5.2 on the vertical and 2.5 on the horizontal are what is conventional with existing projectiles. The reason for the fact that it is not at the optimum stand-off is that the shell casing and nose cone must not exceed a given length. Also the shell casing must contain an optimum amount of explosive charge, and that is the reason why the horizontal coordinate is at about 2.5. It is the maximum distance which can be accommodated with conventional shells and nose cones.

An observation of the graph of FIG. 2 will quite clearly show that much greater penetration can be achieved with the same amount of explosive charge if the point of detonation is about six or seven calibers of distance at the time of detonation. Note that the penetration in calibers at that point on the graph is about seven calibers in depth.

Figure 1:
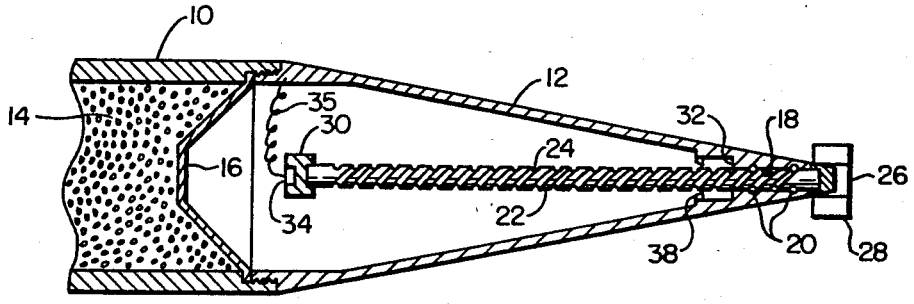
FIG. 1 is a sectional view of the nose cone of a high explosive projectile according to this invention.

FIG. 1 illustrates the structure which allows conventional volumes of shaped explosive charges to be detonated mechanically at essentially any desired distance from the point of impact. The shell casing 10 is illustrated only at its forward point where it connects to the nose cone 12 because the additional rearwardly extending structure is conventional and not a part of this invention. The explosive charge 14 is poured into the casing as a fluid mass and hardens into the desired forward shape and that desired forward shape is controlled by the shape of a metallic truncated cone 16. All this is conventional and the reason for the particular shape in question is not the subject of this invention. Any particular desired shape could be incorporated at the will of the user. What is of significance is the nose cone and its component parts.

Nose cone 12 is preferably metal and includes a bore 18 at its forward end and a pair of ball races 20 are mounted within the bore 18. Their purpose is to allow free movement of a hollow tube 22 for purposes of reciprocation through bore 18. The two spaced apart ball races not only allow reciprocation of the tube 22 but they also provide spaced apart supports which tend to hold the tube aligned with the axis of the cone for purposes which will be obvious from subsequent discussions.

Grooves 24 are cut into the surface of hollow tube 22 for riding in the balls of ball races 20.

Mounted on the forward end of tube 22 is an annulus 26 which has two or more spokes or fins 28 extending essentially radially thereof, although they could be canted up to 2° from the radius. The purpose of the fins 28 will be explained subsequently.

At the remote end of the tube 22, most distant from fins 28, is a locking mechanism 30 and its purpose is to prevent the tube 22 from winding completely out of the nose cone by accident. The lock 30 engages an internal shoulder 32 on the internal forward surface of the nose cone 12 when the projectile is in flight, after it leaves the muzzle of the cannon and before it arrives as the target. Detent pins 38 close behind lock 30 when it is fully in the shoulder.

In operation the projectile will be fired from a cannon and the projectile will proceed toward the target in conventional fashion. As a general rule, the projectile will have imparted to it a rotation when it leaves the barrel of the gun and the purpose is to give the projectile stability in flight and ease it movement through the air.

During the time the projectile is within the barrel and accelerating due to the expanding gases behind the shell casing 10, the tube 22 will remain relatively stationary within the nose cone 12 because of friction and other natural forces. However, when the projectile exits the muzzle of the gun barrel, it will cease to accelerate and will begin to slow in its speed. At that point in time, air will begin to act on the fins 28 and to rotate the tube 22 to cause the tube to screw itself out of the nose cone to project its forward end the desired number of calibers forward from the shaped charge 16. This effectively extends the functional length of the nose cone. The length of the tube is optional but the obvious desire is to have the optimum target penetration and therefore, the desirable length can be determined from the graph shown in FIG. 2.

It will be clear that the screw threads 24 in which the ball races 20 are engaged should spiral in a direction to cause rotation of the tube in a direction opposite to the imparted rotation of the projectile, although it may not make any difference because the wind acting on the fins will impart a considerably greater speed of rotation of the tube than has been imparted to the projectile and so in all likelihood, the tube would still extend itself regardless of the direction of spiral of the threads 24.

When the lock 30 moves forward until it engages shoulder 32, the tube will remain stationary until its forward end engages an obstruction. At that point, it will be forced backward a small amount which will crush 34, a detonating device of conventional design, having wire 35 thereon. The detonation device and its wiring are depicted only generally to convey the idea. There is no need to describe or show the structure to cause detonation because it is conventional.

Having thus described the invention in its preferred embodiment, it will be clear to those having ordinary skill in the art that modifications may be made in the structure without departing from the spirit of the invention. It is not intended that the language used in the specification nor the drawings illustrating the same be deemed to be limiting on the invention. Rather, it is intended that the invention be limited only by the scope of the appended claims.

We claim:

1. A projectile including a shaped explosive charge within a casing, a nose cone attached to one end of the casing and means for extending the part of the nose cone remote from said casing even further from said shaped charge when said projectile is in flight.

2. The projectile of claim 1 wherein the cone includes a threaded tube and extending means comprises said threaded tube being mounted in a bore in said cone, said bore including means cooperating with said threads on said tube to allow said tube to reciprocate with respect to said cone.

3. The projectile of claim 2 wherein the tube extends both inside and outside said bore and inside and outside said cone, the portion of the tube extending outside the cone having radially extending fins mounted thereon.

4. The projectile of claim 3 wherein the cone includes a radially extending shoulder adjacent the inward end of the bore, the end of the tube inside the cone having a radially outwardly extending flange configured to engage said shoulder upon the outward movement of said tube.

5. The projectile of claim 2 wherein the cone includes a radially extending shoulder adjacent the inward end of the bore, the end of the tube inside the cone having a radially outwardly extending flange configured to engage said shoulder upon the outward movement of said tube.

6. The projectile of claim 2 wherein the threads on said tube are configured to accommodate the balls of a ball race mounted on the interior of said bore.

7. The projectile of claim 3 wherein the threads on said tube are configured to accommodate the balls of a ball race mounted on the interior of said bore.

8. The projectile of claim 4 wherein the threads on said tube are configured to accommodate the balls of a ball race mounted on the interior of said bore.

9. The projectile of claim 5 wherein the threads on said tube are configured to accommodate the balls of a ball race mounted on the interior of said bore.

* * * * *